United States Patent
Zywiak et al.

(10) Patent No.: US 9,862,495 B2
(45) Date of Patent: Jan. 9, 2018

(54) AIRCRAFT AIR-CONDITIONING HEAT EXCHANGER CONTAMINATION DETECTION

(71) Applicant: Hamilton Sundstrand Corporation, Windsor Locks, CT (US)

(72) Inventors: Thomas M. Zywiak, Suffield, CT (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 994 days.

(21) Appl. No.: 14/132,973

(22) Filed: Dec. 18, 2013

(65) Prior Publication Data
US 2015/0166186 A1 Jun. 18, 2015

(51) Int. Cl.
G05D 15/00 (2006.01)
B64D 13/06 (2006.01)

(52) U.S. Cl.
CPC ...... *B64D 13/06* (2013.01); *B64D 2013/0618* (2013.01); *Y02T 50/56* (2013.01)

(58) Field of Classification Search
CPC ............ B64D 13/06; B64D 2013/0618; B64D 15/20; Y02T 50/56; F24F 2011/0042; F28D 2021/0021; G01L 13/00; G01L 23/24; B60H 2001/3248
USPC ....................................................... 165/279
See application file for complete search history.

(56) References Cited

U.S. PATENT DOCUMENTS

| | | | | |
|---|---|---|---|---|
| 3,913,833 A | * | 10/1975 | Minett | B60H 1/00007 137/805 |
| 5,418,438 A | * | 5/1995 | Hollenbeck | F23N 1/062 165/246 |
| 5,596,271 A | * | 1/1997 | Lowery | G01P 3/488 324/174 |
| 6,199,387 B1 | * | 3/2001 | Sauterleute | B64D 13/06 62/87 |
| 8,029,608 B1 | * | 10/2011 | Breslin | B01D 46/0086 116/212 |
| 2006/0067833 A1 | * | 3/2006 | McAuliffe | B64D 13/02 417/43 |

(Continued)

FOREIGN PATENT DOCUMENTS

EP 1188666 A1 3/2002
EP 2492199 A2 8/2012

OTHER PUBLICATIONS

French Search Report for FR Application No. 1462688, dated Mar. 10, 2017, 5 pages.

*Primary Examiner* — Travis Ruby
(74) *Attorney, Agent, or Firm* — Kinney & Lange, P.A.

(57) ABSTRACT

An aircraft system includes a fan, a differential pressure sensor, a temperature sensor, and a system controller. The fan provides airflow for at least one heat exchanger. The differential pressure sensor senses a pressure difference between an inlet of the fan and a diffuser exit of the fan. The temperature sensor senses a temperature at the inlet of the fan. The system controller is configured to receive the sensed pressure difference, the sensed temperature, and a speed of the fan, and determines an operating point of the fan based upon the sensed pressure difference, the speed of the fan, and the sensed temperature. The operating point is indicative of contamination of the at least one heat exchanger.

14 Claims, 3 Drawing Sheets

(56) References Cited

U.S. PATENT DOCUMENTS

| | | | |
|---|---|---|---|
| 2007/0119205 A1* | 5/2007 | Zywiak | B64D 13/06 62/401 |
| 2009/0112368 A1* | 4/2009 | Mann, III | B64F 1/364 700/275 |
| 2010/0139908 A1* | 6/2010 | Slessman | F28F 9/0265 165/279 |
| 2014/0260341 A1 | 9/2014 | Vaisman et al. | |
| 2016/0223234 A1 | 8/2016 | Vaisman | |

* cited by examiner

AIRCRAFT AIR-CONDITIONING HEAT EXCHANGER CONTAMINATION DETECTION

BACKGROUND

The present invention is related to aircraft air conditioning systems, and in particular to a system and method for detecting contamination within air conditioning systems.

Aircraft often include air conditioning "packs" that, among other things, provide cool air for the aircraft. These aircraft also may include one or more ram air fans that draw air through the air conditioning packs while the aircraft is grounded. The ram air is drawn through, for example, heat exchangers of the air conditioning packs. Contamination from the ambient air may increase the pressure drop across the heat exchangers which may reduce the flow through the fan and heat exchangers. Significant heat exchanger contamination can reduce the airflow enough that the ram air fan may operate in an unstable operating mode which may lead to excessive blade stress and in turn, failure of the ram air fan.

SUMMARY

An aircraft system includes a fan, a differential pressure sensor, a temperature sensor, and a system controller. The fan provides airflow for at least one heat exchanger. The differential pressure sensor senses a pressure difference between an inlet of the fan and a diffuser exit of the fan. The temperature sensor senses a temperature at the inlet of the fan. The system controller is configured to receive the sensed pressure difference, the sensed temperature, and a speed of the fan, and determines an operating point of the fan based upon the sensed pressure difference, the speed of the fan, and the sensed temperature. The operating point is indicative of contamination of the at least one heat exchanger.

DETAILED DESCRIPTION

Contamination of air-conditioning "pack" heat exchangers may be determined based upon a determined operating point of a ram air fan. Aircraft ram air fans may be utilized to draw air through air conditioning systems. Contamination of heat exchangers within the air conditioning system may cause a reduction in airflow through the fan and heat exchangers. This may cause the fan to operate in an unstable operating mode. The operating point of the fan is determined by the air conditioning pack controller based upon the pressure difference across the fan, the temperature at the fan inlet, and the rotational speed of the fan. If the determined operating point of the fan is greater than a threshold, the pack controller may reduce the speed of the fan to a safe operating speed and provide a maintenance indication for maintenance on, for example, a maintenance bus.

Figure 1:
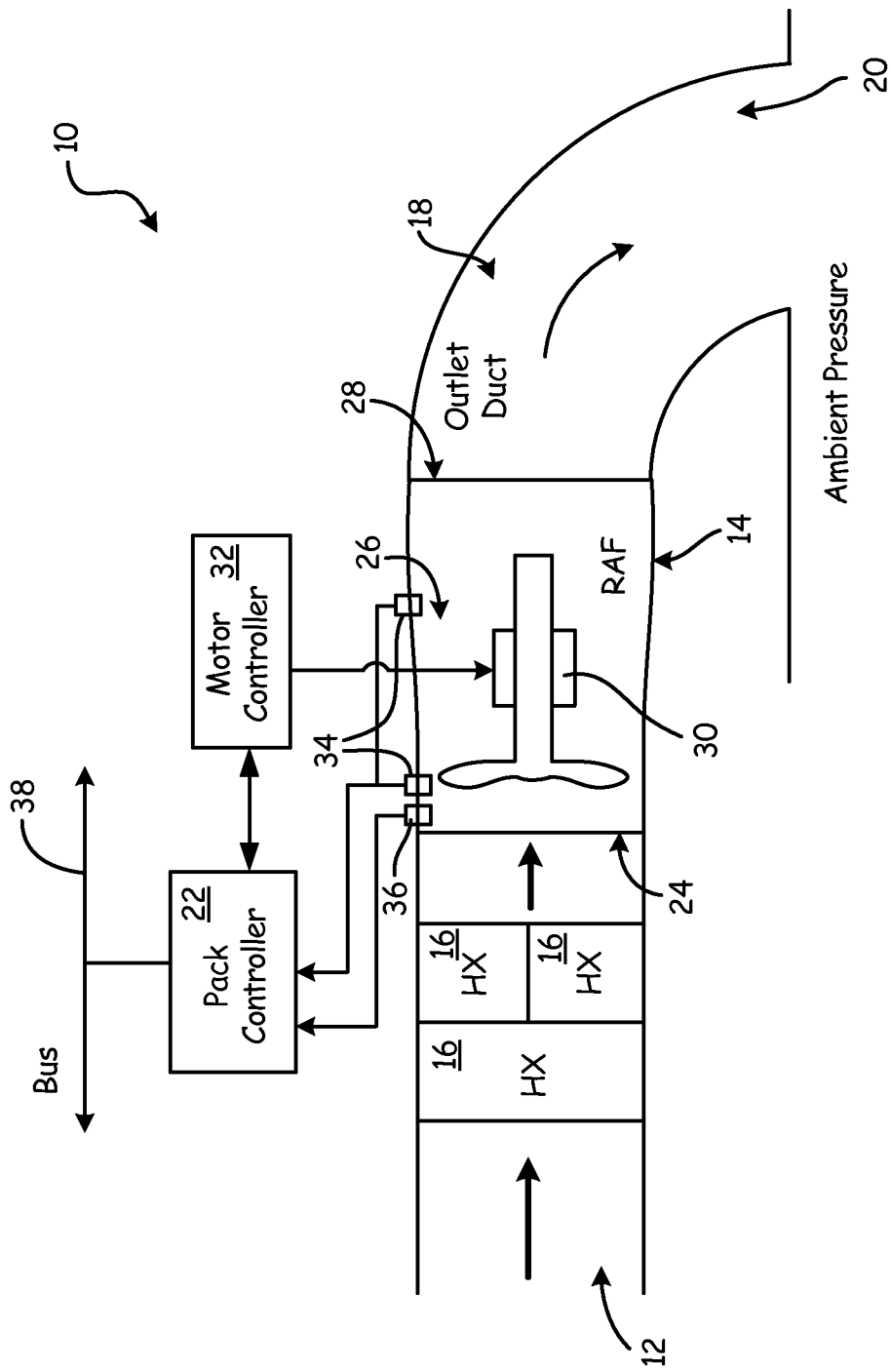
FIG. 1 is a block diagram of an aircraft air conditioning system that includes sensors for determining contamination within the air conditioning system.

FIG. 1 is a block diagram of aircraft system 10 that includes sensors for determining contamination within an air conditioning pack. System 10 includes ram air inlet 12, ram air fan 14, heat exchangers 16, outlet duct 18, ram air exit 20, and pack controller 22. Ram air fan 14 includes, among other things, inlet 24, diffuser 26, outlet 28, and motor 30. Motor 30 is controlled by motor controller 32. Differential pressure sensor 34 is configured to sense a pressure difference between inlet 24 and an exit of diffuser 26. Sensor 36 is configured to sense, for example, a temperature at fan inlet 24. Motor 30 may be, for example, an electric motor. Motor controller 32 drives motor 30 and thus, knows the speed of ram air fan 14. Ram air fan 14 may also be, for example, turbine driven. In this case, any traditional speed sensor, such as an optical speed sensor, may be used to determine the speed of ram air fan 14. Pack controller 22 may communicate with other aircraft systems using, for example, communication bus 38. While illustrated as including three heat exchangers 16, any number of heat exchangers may be included within system 10.

In the present embodiment, ambient air is drawn into heat exchangers 16 through ram air inlet 12. Air flows through heat exchangers 16 to fan inlet 24. Air flows through diffuser 26, fan outlet 28, outlet duct 18, and then exits through ram air exit 20. A pressure drop may occur across heat exchangers 16 that causes a reduction in the airflow through heat exchangers 16. This pressure drop increases as heat exchangers 16 become contaminated by contaminants in the ambient air. Contamination of heat exchangers 16 may reduce the flow through ram air fan 14 such that fan 14 may operate in an unstable mode. It is advantageous to detect the reduced flow caused by contamination of heat exchangers 16 to avoid unstable operating conditions of ram air fan 14.

The speed of fan 14, in conjunction with differential pressure sensor 34 and a sensed temperature from sensor 36, is used to detect unstable fan operating conditions created by contamination of heat exchangers 16. Differential pressure sensor 34 is configured to measure the pressure difference between fan inlet 24 and an exit of diffuser 26. This provides a delta pressure measurement across fan 14.

Utilizing the sensed pressure difference from differential pressure sensor 34, a pressure at fan inlet 24 may be determined. Pack controller 22 determines an airflow through ram air fan 14 using the sensed pressure difference from sensor 34. Utilizing the determined flow, as well as, for example, a known pressure drop coefficient of outlet duct 18, the pressure drop of outlet duct 18 may be determined. Using the determined pressure drop of outlet duct 18, as well as the pressure of the ambient air, the pressure at fan outlet 28 may be determined. The ambient pressure may be provided to pack controller 22 from, for example, a static pressure air data module or other aircraft system on communication bus 38. Using the determined pressure at fan outlet 28 as well as the sensed pressure difference from sensor 34, the pressure at fan inlet 24 may be determined.

In another embodiment, the pressure at fan inlet 24 may be directly measured by a pressure sensor. Sensor 36 may also include, for example, an integral pressure sensor or a separate pressure sensor in combination with a temperature sensor. The pressure measured by the pressure sensor at inlet 24 may be provided to controller 22.

Figure 2:
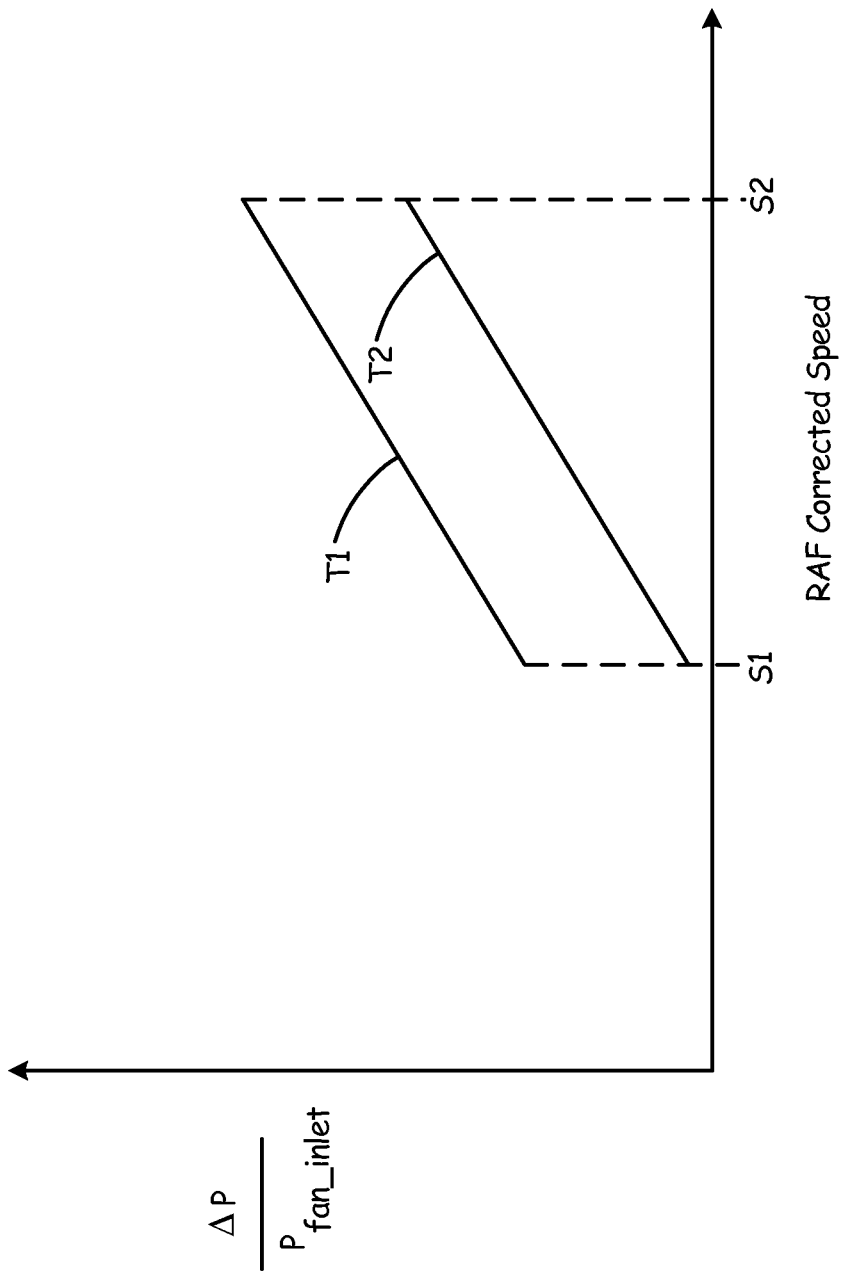
FIG. 2 is a chart illustrating operating thresholds of a ram air fan based upon the pressure difference across the fan and the speed of the fan.

With continued reference to FIG. 1, FIG. 2 is a chart illustrating operating thresholds of ram air fan 14 based upon the pressure difference across fan 14 and the speed of fan 14. The Y-axis reflects the pressure difference between fan inlet 24 and an exit diffuser 26. For greater accuracy, the pressure difference may be divided by the ambient pressure.

For even greater accuracy, the pressure difference may be divided by the determined inlet pressure at fan inlet 24. The X-axis reflects the speed of ram air fan 14. For greater accuracy, this may be the corrected speed, which is determined utilizing the sensed temperature from sensor 36 as well as the actual speed of fan 14 which may be provided by, for example, motor controller 32 or a speed sensor. Corrected speed is the speed fan 14 would rotate at if the conditions at inlet 24 were ambient conditions at sea level.

Threshold lines T1 and T2 correspond to, for example, a threshold above which fan 14 will operate in an unstable mode, and a threshold below which fan 14 will operate in a normal mode, respectively. These thresholds may be determined, for example, through testing of fan 14. These thresholds are illustrated for a range of corrected speeds between S1 and S2 which are any corrected speeds of fan 14 such as, for example, eight-thousand revolutions-per-minute (RPM) and eleven-thousand RPM. Threshold line T2 represents operating points of fan 14 for which any normalized pressure difference below that value indicates that fan 14 is operating normally for the given corrected speed. This threshold is any selected value known to indicate normal operation of fan 14 such as, for example, 30% margin of a surge condition. Threshold line T1 indicates, for example, operating points for which fan 14 will operate in an unstable operating mode for any normalized pressure differentials above the threshold for a given corrected speed. This threshold may be determined through, for example, testing of ram air fan 14 and may indicate, for example, 0% margin of a surge condition. The actual threshold used to determine an unstable operating condition for which pack controller 22 will reduce the speed of fan 14 and provide a maintenance indication may be any selected threshold between, for example, thresholds T1 and T2.

While illustrated as normalizing the pressure differential using the pressure at fan inlet 24, the ambient pressure may also be utilized to normalize the pressure difference, or the pressure difference may not be normalized at all. By normalizing the pressure difference using the pressure at fan inlet 24, unstable operating conditions may be more accurately predicted in some embodiments by eliminating pressure losses due to outlet duct 18, and pressure differences created by airports being at varying altitudes.

Once it is determined that the current operating point has exceeded the threshold, pack controller 22 can operate fan 14 in a safe operating mode and provide an indication on communication bus 38 that maintenance of heat exchangers 16 is required. To operate fan 14 in a safe operating mode, pack controller 22 may indicate to motor controller 32 to decrease the speed of the fan below, for example, eight-thousand RPM, or any other speed for which fan 14 may be operated without the possibility of unstable operation caused by, for example, contamination of heat exchangers 16. Heat exchangers may then be, for example, cleaned by maintenance in order to remove the contamination causing the reduced flow.

Figure 3:
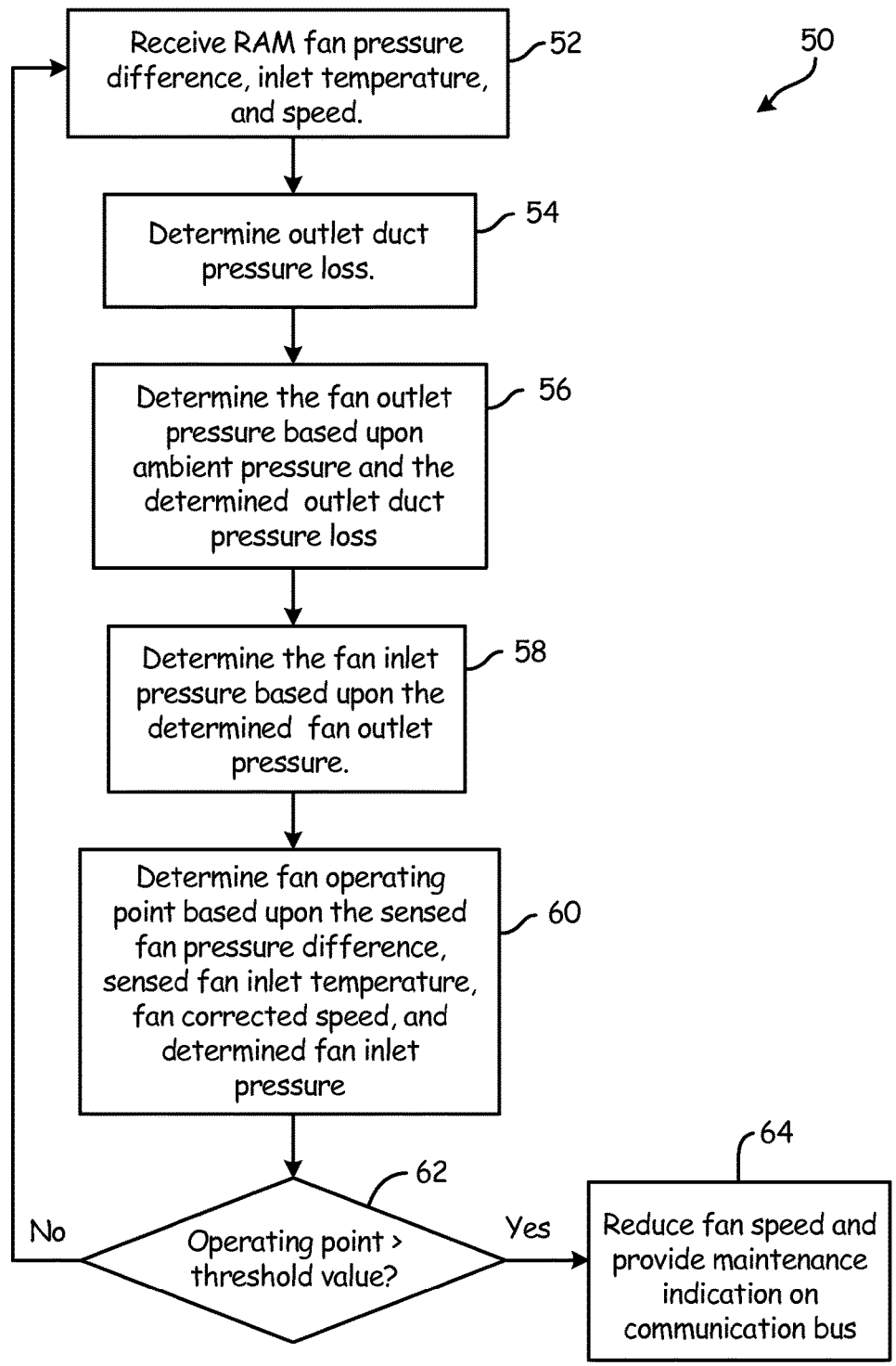
FIG. 3 is a flowchart illustrating a method of detecting contamination within an aircraft air conditioning system.

FIG. 3 is a flowchart illustrating method 50 of detecting contamination within an aircraft air conditioning system. At step 52, a pressure difference for fan 14 is received from differential pressure sensor 34 by pack controller 22. A temperature at fan inlet 24 is received by pack controller 22 from sensor 36, and the speed of fan 14 is received by pack controller 22 from motor controller 32. At step 54, pack controller 22 determines the pressure loss of outlet duct 18 based upon the sensed pressure difference from sensor 34 and, for example, a known duct loss coefficient for duct 18. At step 56, the outlet pressure at fan outlet 28 is determined by pack controller 22 based upon the ambient pressure and the determined duct loss of duct 18. The ambient pressure is obtained by pack controller 22 from, for example, another aircraft system on communication bus 38. At step 58, the pressure at fan inlet 24 is determined by pack controller 22 based upon the determined pressure at fan outlet 28 and the pressure difference sensed by sensor 34. In an embodiment, system 10 may include a pressure sensor at fan inlet 24, in which case steps 54-58 could be replace by measuring the pressure at fan inlet 24 using the pressure sensor.

At step 60, an operating point of fan 14 is determined based upon the determined pressure at fan inlet 24, the sensed pressure difference from sensor 34, and the corrected speed of fan 14. The corrected speed is determined by pack controller 22 based upon the sensed temperature from sensor 36, and the actual speed of fan 14 from motor controller 32 or a speed sensor. The operating point of fan 14 is indicative of a contamination level of heat exchangers 16. At step 62, it is determined whether the operating point of fan 14 is greater than a threshold. The threshold may be determined through, for example, testing of fan 14. This threshold is indicative of a contamination of heat exchangers 16 that is great enough to create an unstable operating condition of fan 14. If the operating point is less than the threshold, method 50 returns to step 52. If the operating point is greater than the threshold, method 50 proceeds to step 64. At step 64, pack controller 22 may indicate to motor controller 32 to reduce the speed of fan 14 to a safe operating speed such as, for example, less than eight-thousand RPM. In another embodiment, if fan 14 is turbine driven, controller 22 may reduce the speed of fan 14 using any method. Pack controller may also provide a maintenance indication on communication bus 38 indicating that heat exchangers 16 need to be cleaned.

Discussion of Possible Embodiments

An aircraft system includes, among other things: a fan, a differential pressure sensor, a temperature sensor, and a system controller. The fan provides airflow for at least one heat exchanger. The differential pressure sensor senses a pressure difference between an inlet of the fan and a diffuser exit of the fan. The temperature sensor senses a temperature at the inlet of the fan. The system controller is configured to receive the sensed pressure difference, the sensed temperature, and a speed of the fan, and determines an operating point of the fan based upon the sensed pressure difference, the speed of the fan, and the sensed temperature. The operating point is indicative of contamination of the at least one heat exchanger.

The aircraft system of the preceding paragraph can optionally include, additionally and/or alternatively, any one or more of the following features, configurations and/or additional components:

A further embodiment of the foregoing system, wherein the system controller determines a flow through the fan based upon the sensed pressure difference, and wherein the system controller determines a pressure loss for the exit duct based upon the determined flow.

A further embodiment of any of the foregoing systems, wherein the system controller determines an outlet pressure of the fan based upon the determined pressure loss for the exit duct, and wherein the system controller determines an inlet pressure of the fan based upon the determined outlet pressure and the sensed pressure differential.

A further embodiment of any of the foregoing systems, wherein the system controller determines the operating point of the fan based further upon the determined inlet pressure of the fan.

A further embodiment of any of the foregoing systems, further comprising a pressure sensor that measures an inlet pressure of the fan, wherein the system controller determines the operating point of the fan based further upon the measured inlet pressure of the fan.

A further embodiment of any of the foregoing systems, wherein the system controller reduces the speed of the fan upon the determined operating point of the fan reaching a threshold.

A further embodiment of any of the foregoing systems, wherein the system controller further provides a maintenance indication on a communication bus upon the determined operating point of the fan reaching the threshold.

A further embodiment of any of the foregoing systems, further comprising a motor controller that drives the fan, wherein the speed of the fan is provided to the system controller from the motor controller.

A further embodiment of any of the foregoing systems, further comprising a speed sensor, wherein the fan is turbine driven and the speed sensor provides the speed of the fan to the system controller.

A method of detecting contamination of at least one heat exchanger in an aircraft system includes, among other things: sensing, by a differential pressure sensor, a pressure differential between an inlet of a fan and a diffuser exit of the fan; sensing, by a temperature sensor, an inlet temperature at the inlet of the fan; providing the sensed pressure differential and sensed inlet temperature to a system controller; and determining, by the system controller, an operating point of the fan based upon the sensed pressure differential, a speed of the fan, and the sensed inlet temperature, wherein the operating point of the fan is indicative of contamination of the at least one heat exchanger.

The method of the preceding paragraph can optionally include, additionally and/or alternatively, any one or more of the following features, configurations and/or additional components:

A further embodiment of the foregoing method, further includes: determining, by the system controller, a flow through the fan based upon the sensed pressure differential; determining, by the system controller, a duct pressure loss of an outlet duct, wherein the outlet duct is connected between an outlet of the fan and ambient air; determining, by the system controller, an outlet pressure at the outlet of the fan based upon the duct pressure loss and an ambient pressure of the ambient air; and determining, by the system controller, an inlet pressure at the inlet of the fan based upon the determined outlet pressure and the sensed pressure differential, wherein determining the operating point of the fan is further based upon the determined inlet pressure.

A further embodiment of any of the foregoing methods, further comprising measuring an inlet pressure at the inlet of the fan using an inlet pressure sensor, wherein determining the operating point of the fan is further based upon the measured inlet pressure.

A further embodiment of any of the foregoing methods, further comprising reducing the speed of the fan using the system controller if the determined operating point of the fan exceeds a threshold; and providing a maintenance indication using the system controller if the determined operating point of the fan exceeds the threshold.

A further embodiment of any of the foregoing methods, further comprising providing the speed of the fan to the system controller from a motor controller, wherein the motor controller controls the speed of the fan.

A further embodiment of any of the foregoing methods, further comprising providing the speed of the fan to the system controller from a speed sensor, wherein the fan is turbine driven and the system controller controls the speed of the fan.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft system comprising:
a fan that provides airflow for at least one heat exchanger;
a differential pressure sensor that senses a pressure difference between an inlet of the fan and a diffuser exit of the fan;
a temperature sensor that senses a temperature at the inlet of the fan; and
a system controller configured to receive the sensed pressure difference, the sensed temperature, and a speed of the fan, wherein the system controller determines an operating point of the fan, wherein the operating point of the fan is the sensed pressure difference at a respective corrected speed of the fan, and wherein the respective corrected speed of the fan is the speed of the fan compensated by the sensed temperature, and wherein the operating point is indicative of contamination of the at least one heat exchanger;
wherein the system controller is further configured to compare the operating point of the fan to a threshold indicative of an unstable operating condition of the fan, wherein the threshold is a threshold pressure difference at the respective corrected speed of the fan; and
wherein the system controller is further configured to reduce the speed of the fan if the operating point of the fan is greater than the threshold, wherein the speed of the fan is reduced to a corrected speed of the fan below which the fan operates in a stable operating condition.

2. The aircraft system of claim 1, further comprising an exit duct connected between an outlet of the fan and ambient air, wherein the system controller determines a flow through the fan based upon the sensed pressure difference, and wherein the system controller determines a pressure loss for the exit duct based upon the determined flow.

3. The aircraft system of claim 2, wherein the system controller determines an outlet pressure of the fan based upon the determined pressure loss for the exit duct, and wherein the system controller determines an inlet pressure of the fan based upon the determined outlet pressure and the sensed pressure differential.

4. The aircraft system of claim 3, wherein the system controller determines the operating point of the fan based further upon the determined inlet pressure of the fan.

5. The aircraft system of claim 1, further comprising a pressure sensor that measures an inlet pressure of the fan, wherein the system controller determines the operating point of the fan based further upon the measured inlet pressure of the fan.

6. The aircraft system of claim 1, wherein the system controller further provides a maintenance indication on a communication bus upon the determined operating point of the fan reaching the threshold.

7. The aircraft system of claim 1, further comprising a motor controller that drives the fan, wherein the speed of the fan is provided to the system controller from the motor controller.

8. The aircraft system of claim 1, further comprising a speed sensor, wherein the fan is turbine driven and the speed sensor provides the speed of the fan to the system controller.

9. A method of detecting contamination of at least one heat exchanger in an aircraft system, the method comprising:
   sensing, by a differential pressure sensor, a pressure differential between an inlet of a fan and a diffuser exit of the fan;
   sensing, by a temperature sensor, an inlet temperature at the inlet of the fan;
   providing the sensed pressure differential and sensed inlet temperature to a system controller;
   determining, by the system controller, an operating point of the fan, wherein the operating point of the fan is the sensed pressure difference at a respective corrected speed of the fan, and wherein the respective corrected speed of the fan is the speed of the fan compensated by the sensed temperature, wherein the operating point of the fan is indicative of contamination of the at least one heat exchanger;
   comparing the operating point of the fan to a threshold indicative of an unstable operating condition of the fan, wherein the threshold is a threshold pressure difference at the respective corrected speed of the fan; and
   reducing the speed of the fan using the system controller if the operating point of the fan exceeds the threshold, wherein the speed of the fan is reduced to a corrected speed of the fan below which the fan operates in a stable operating condition.

10. The method of claim 9, further comprising:
    determining, by the system controller, a flow through the fan based upon the sensed pressure differential;
    determining, by the system controller, a duct pressure loss of an outlet duct, wherein the outlet duct is connected between an outlet of the fan and ambient air;
    determining, by the system controller, an outlet pressure at the outlet of the fan based upon the duct pressure loss and an ambient pressure of the ambient air; and
    determining, by the system controller, an inlet pressure at the inlet of the fan based upon the determined outlet pressure and the sensed pressure differential, wherein determining the operating point of the fan is further based upon the determined inlet pressure.

11. The method of claim 9, further comprising measuring an inlet pressure at the inlet of the fan using an inlet pressure sensor, wherein determining the operating point of the fan is further based upon the measured inlet pressure.

12. The method of claim 9, further comprising:
    providing a maintenance indication using the system controller if the determined operating point of the fan exceeds the threshold.

13. The method of claim 9, further comprising providing the speed of the fan to the system controller from a motor controller, wherein the motor controller controls the speed of the fan.

14. The method of claim 9, further comprising providing the speed of the fan to the system controller from a speed sensor, wherein the fan is turbine driven and the system controller controls the speed of the fan.

\* \* \* \* \*